United States Patent
Tabor et al.

(10) Patent No.: US 8,843,671 B1
(45) Date of Patent: Sep. 23, 2014

(54) DYNAMIC RESOURCE ALLOCATION FOR SERIAL ATTACHED SCSI DEVICES

(75) Inventors: Gregory Arthur Tabor, Colorado Springs, CO (US); Kurt Marshall Schwemmer, Colorado Springs, CO (US); John Matthew Adams, Colorado Springs, CO (US)

(73) Assignee: PMC-Sierra US Inc., Sunnyvale, CA (US)

( * ) Notice: Subject to any disclaimer, the term of this patent is extended or adjusted under 35 U.S.C. 154(b) by 165 days.

(21) Appl. No.: 13/406,390

(22) Filed: Feb. 27, 2012

(51) Int. Cl.
*G06F 3/00* (2006.01)
*G06F 5/00* (2006.01)

(52) U.S. Cl.
USPC .................. 710/36; 710/15; 710/29; 710/40; 710/41

(58) Field of Classification Search
None
See application file for complete search history.

(56) References Cited

U.S. PATENT DOCUMENTS

| 2007/0093124 A1* | 4/2007 | Varney et al. ............... 439/499 |
| 2012/0005384 A1* | 1/2012 | Honjo et al. ................ 710/109 |
| 2012/0042062 A1* | 2/2012 | Borade et al. ............... 709/224 |

* cited by examiner

*Primary Examiner* — Kris Rhu
(74) *Attorney, Agent, or Firm* — North Weber & Baugh LLP (57) ABSTRACT

Various embodiments of the invention provide resource management of available data bandwidth of a SAS system in a non-uniform way. In certain embodiments, arbitration wait time values are adaptively modified to achieve a specified performance quota for a link.

20 Claims, 5 Drawing Sheets

DYNAMIC RESOURCE ALLOCATION FOR SERIAL ATTACHED SCSI DEVICES

BACKGROUND

A. Technical Field

The present invention relates to systems, devices, and methods of managing traffic in communication systems, and more particularly, to the optimization of data transfer rates between Serial Attached SCSI devices.

B. Background of the Invention

There is growing demand for deploying Serial-Attached-SCSI (SAS) topologies in tiered storage environments that use different types of storage devices with incongruous performance attributes. For example, Solid State Disk drives (SSDs) provide substantially higher random I/O performance compared with their mechanical counterparts in exchange for a much higher dollar-per-gigabyte price point. It is increasingly popular to have systems utilizing a number of SSDs for their significantly faster access rate alongside a much larger number of slower, inexpensive mechanical spinning disk drives. This combination of different types of devices within a storage network presents unique challenges.

The SAS signaling protocol includes standard fairness rules intended to provide fair access to all devices equally, which comes at the expense of reducing the performance of ultra high performance devices, such as SSDs, that did not exist when the SAS fairness rules were designed. As a result, when system designers use high performance devices together with significantly slower devices in SAS storage systems, the standard fairness protocol causes underutilization of the ultra fast devices that have to share data bandwidth with all the slower devices.

What is needed are tools for system designers to overcome the above-described limitations.

SUMMARY OF THE INVENTION

Various embodiments of the invention allow for allocating data bandwidth non-uniformly among multiple devices within a storage network. In particular, certain embodiments of the invention allow system designers to modify the standard arbitration fairness rules by specifying performance quotas for high-performance devices to transfer data at higher rates.

In one embodiment, a closed-loop feedback control system is implemented into a SAS topology to dynamically increase arbitration wait time values for a high-performance device to increase its arbitration priority of connection requests until a specified performance quota is achieved for that device.

Certain embodiments of the invention increase overall system performance and are backward compatible with the standard SAS protocol.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

In this document open frame, open address frame, and connection request are used interchangeably. "Device" includes servers, blades, operating systems, volumes, partitions, disks, drives, storage devices, other SAS expanders, bus adapters, and other storage elements recognized by one of skilled in the art.

Figure 1:
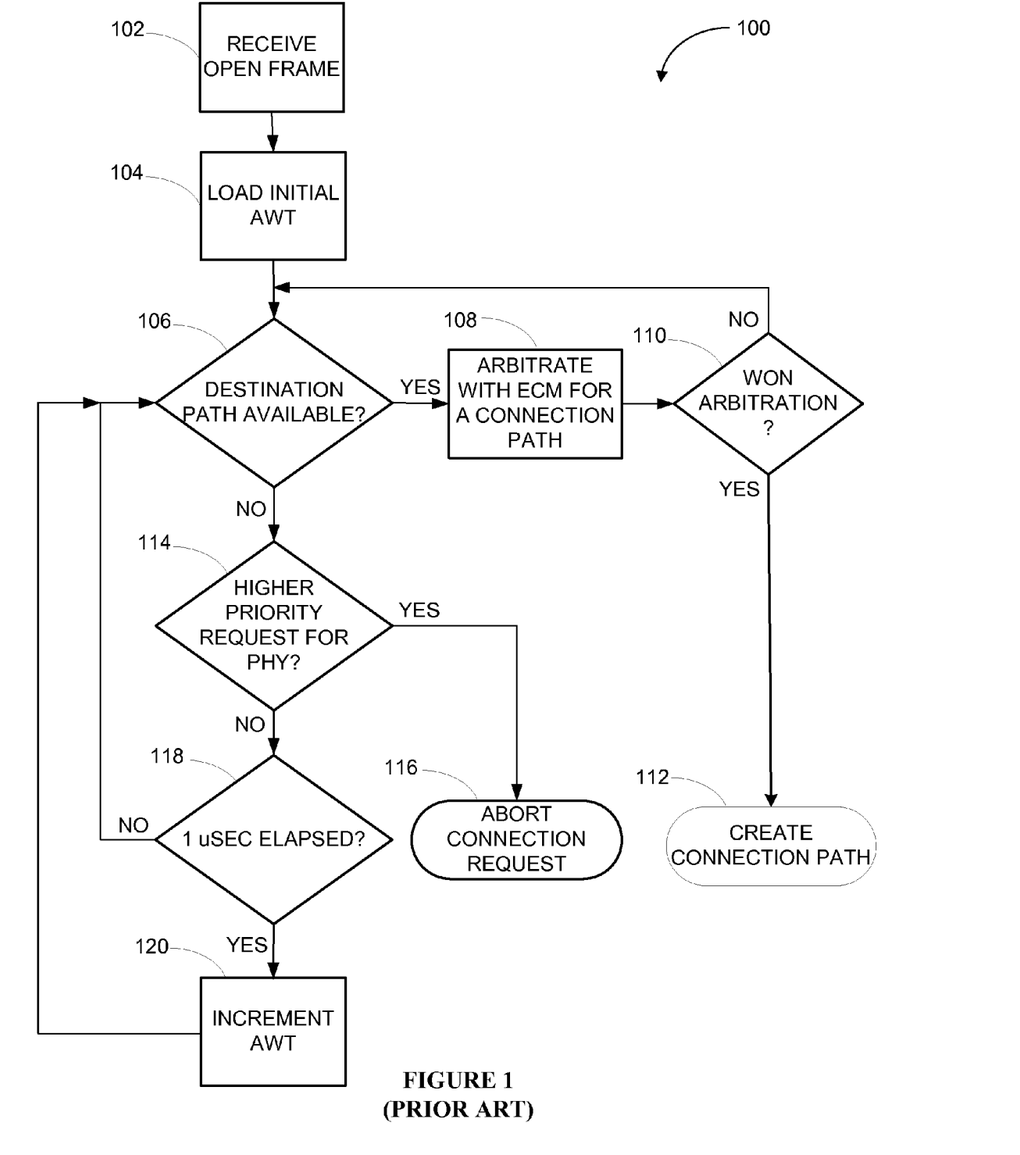
FIG. 1 is a general illustration of an arbitration fairness logic in a SAS expander that follows prior art standard arbitration fairness rules.

FIG. 1 is a flowchart that generally illustrates an arbitration fairness logic in a SAS expander that follows the prior art standard arbitration fairness rules as defined by the SAS protocol in creating links between devices. In a SAS topology, links between devices are established by a method of storing and forwarding OPEN address frames (OPEN frames) as they propagate from hop to hop across interconnected SAS expander devices which interconnect to multiple end devices.

The process for creating links between devices 100 starts at step 102 when the SAS expander receives an OPEN address frame, or connection request, from a device. The OPEN frame is a request to the SAS expander to create a link to a target device. The OPEN frame comprises an arbitration wait time (AWT) value that indicates how long the connection request has been waiting for a connection. When the original source device first sends out an OPEN frame the AWT is zero. The OPEN frame also contains a source address and a destination address to the target device.

At step 104, an initial AWT value is loaded from the OPEN frame into the AWT value into the SAS expander.

At step 106, the SAS expander determines whether the destination path is available to make the point-to-point connection between the source address physical link (phy) and the destination address phy of the request to route the OPEN frame from the requesting source phy to the target phy.

If the destination path is available, i.e. the connection path is not active to another phy, then, at step 108, the SAS expander performs arbitration with the SAS expander's expander connection manager (ECM). The ECM assigns winner status first to the pending OPEN frame having the highest AWT value, or in the event of a tie to the highest source address. The highest AWT value indicates that the winning OPEN frame has been waiting the longest.

At step 110, if the arbitration is won by the present connection request, then the SAS expander creates the requested connection path 112 for the device. If the arbitration is not won by the present connection request, then the device returns to step 106 to determine anew whether the destination path is available. It is possible that steps 106-110 will have to be repeated multiple times before determining that there is no destination path available. For example, when a SAS port, in order to increase data transfer rates, allows multiple phys to connect to the same target phy using multiple open connections. Such a SAS port having multiple phys is referred to as wide port.

If at step 106 the destination path is occupied, then, at step 114, the SAS expander determines whether any pending OPEN frames requesting the same destination as the present OPEN frame have a higher AWT value, i.e., a higher priority.

If a pending OPEN frame does have a higher AWT, for example, a frame returning through the source address of the present request, then the SAS expander signals the present OPEN frame to abandon the connection request 116, thereby making the connection available for the higher priority request.

If no other OPEN frame with a higher AWT value is requesting the originating source address of the present OPEN frame, then, at step 118, the SAS expander determines whether a certain waiting period has elapsed since the SAS device received the present OPEN frame.

Typically, at each expander hop an AWT timer is implemented that maintains a measurement of the age of the connection request. By design, the arbitration wait timer is a 16-bit timer that saturates as a 16-bit value. There is no provision in the standard SAS specification for counting beyond that value. A device that reaches maximum value (FFFF), stops counting and obtains the highest possible priority. If two or more old connection requests that reach the maximum value at the same time, the arbitration falls back to the SAS address of the source device as a tiebreaker, so that the system converges in a consistent way. The SAS address is also encoded in the open frame. Tiebreaking is also used for requests that have not saturated but have the same AWT value.

The ATW timer increments at 1 μsec. intervals for the first 32,767 counts and then switches to 1 msec. intervals for the subsequent 32,768 counts, saturating at a count of 65,535. The total range of the time measurement is therefore approximately 32.8 sec. with the first 32.8 msec. being measured at a higher level of resolution.

At step 120, if 1 μsec. has elapsed, the SAS expander increments the AWT value for the present OPEN frame and returns to step 106 to continue to determine the availability of the destination path. If, at step 118, 1 μsec. has not elapsed yet, then the SAS expander maintains the AWT value and returns to step 106 to continue to determine the availability of the destination path. One of the loops involving steps 106, 114, 118, and 120 or steps 106, 108, and 110 is repeated until either the AWT value is high enough to win arbitration at step 110 and a connection path is created 112, or until, at step 114, another, higher priority request for the originating phy exists, such that the present connection request is aborted 116.

Figure 2:
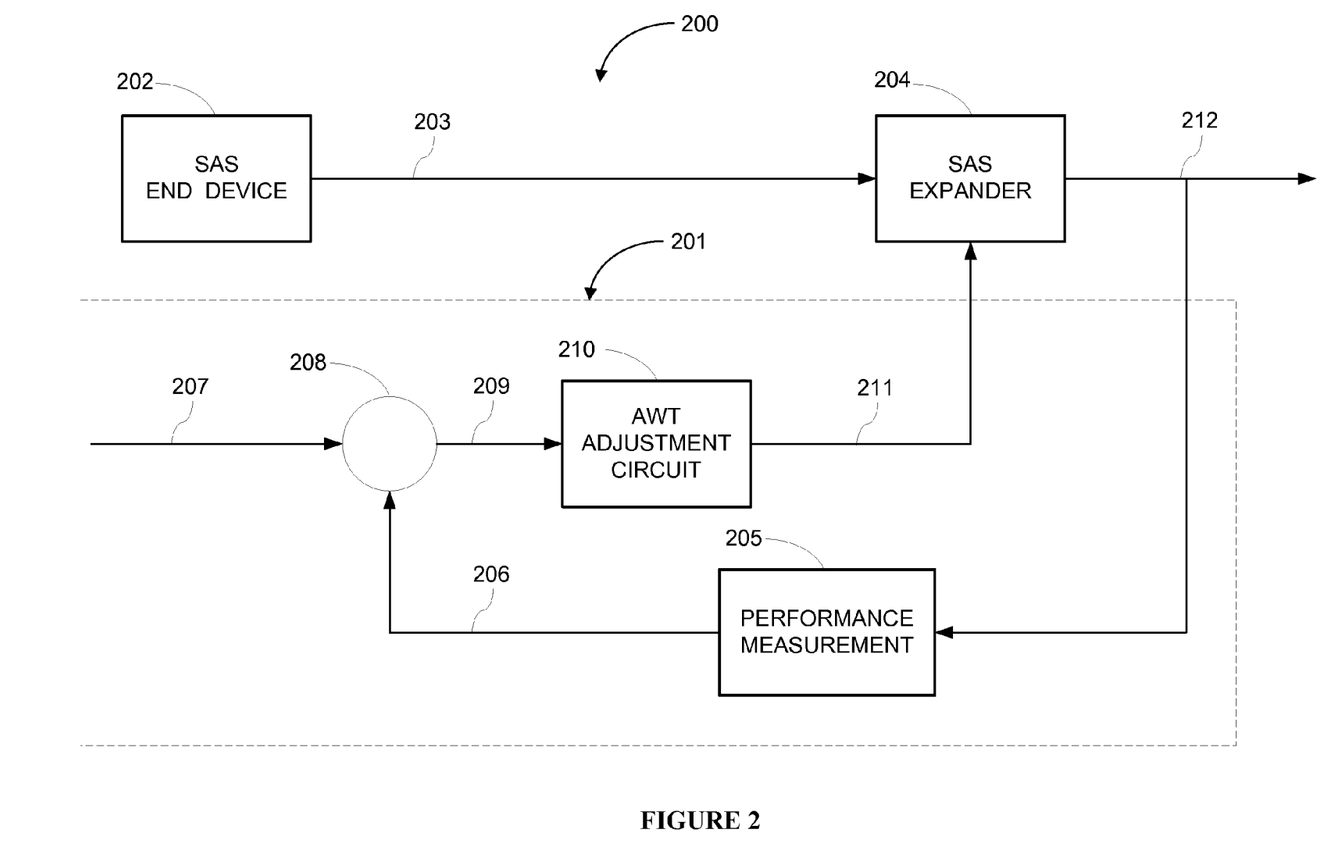
FIG. 2 illustrates a SAS network configuration comprising an adaptation circuit according to various environment of the invention.

FIG. 2 illustrates a SAS network configuration comprising an adaptation circuit according to various embodiments of the invention. SAS end device 202 can be a storage device (e.g., a hard disk drive) that requests to be connected to a host device (not shown, e.g., a host bus adapter). SAS expander 204 is a switch and router that manages functions between SAS end device 202 and the host device. SAS expander 204 may allow multiple drives to be controlled by a single processor. One skilled in the art will appreciate that in SAS topology 200 any number of SAS expanders 204 may be connected to each other or to any number of SAS end devices 202 in the network.

SAS end device 202 and SAS expander 204 use the SAS protocol, which sets forth a transfer layer protocol for transporting commands between SAS devices and a serial physical interconnect. Since the protocol uses point-to-point connections (links) to establish a communication between source devices and target devices, SAS expander 204 uses OPEN requests to establish a communication between SAS end device 202 and a particular SAS target device, each of which can act as either source device or target device. Once a request is accepted, communication is established, and an OPEN frame can be communicated from a source phy to the other end of the link, the target phy and vice versa.

As previously described, SAS expander 204 establishes connection fairness by allowing OPEN requests that have a greater AWT to be granted arbitration priority. Adaptation circuit 201 is coupled to SAS expander 204 according to various embodiments of the invention. In one embodiment, circuit elements of adaptation circuit 201 comprises performance measurement element 205, comparator 208, adjustment circuit 210, and performance measurement element 205. Circuit elements may be located on SAS expander 204 or external to it. Adaptation circuit 201 forms a closed feedback loop with SAS topology 200 to enable dynamic modification of AWT values. In one embodiment, the AWT value of SAS end device 202 is dynamically increased, thereby increasing the arbitration priority, until a minimum desired performance quota is achieved.

Performance measurement element 205 is coupled to SAS expander 204 and may be physically located on one of the ports of SAS expander 204 to measure the traffic through the expander. In one embodiment, performance measurement element 205 measures I/O performance 212 on a connection inside of SAS expander 204, for example by monitoring the amount of traffic that passes in a given period of time.

In storage applications, the level of performance of enterprise storage systems is typically measured with one of two metrics. The first performance metric is in I/O per second (IOPS). It indicates how fast a storage device can fetch relatively small random data from discontiguous physical disk locations. This type performance metric is typically used for relatively small transfer sizes, such as in online transaction processing. The second performance metric is in megabytes per second (MB/s). A MB/s type performance metric indicates the bandwidth of storage devices is typically used for relatively large transfer sizes, such as in streaming video applications, decision support systems, or file system backup.

Both performance metrics are supported by the invention. The system designer will choose the appropriate metric based on the application.

In one embodiment, desired I/O performance value 207 is a configurable, but fixed number that may be specified by the system designer as a particular speed or a performance quota. The specification may be implemented, for example, by firmware or through management software. At a low level, the firmware may run on a microprocessor coupled to SAS expander 204. The microprocessor reads from and writes to registers to set the parameters associated with the quota or the speed. At a higher level, management software may run on a host system that communicates to the microprocessor and the SAS expander to configure the speed or quota.

Comparator 208 receives I/O performance value 206 measured by performance measurement element 205, compares it to desired I/O performance value 207, and generates comparison result 209, such as an error signal, indicative of whether the desired I/O performance is achieved. Comparison result 209 is propagated to adjustment circuit 210 for further processing.

In one embodiment, comparator 208 is integrated into adjustment circuit 210. Adjustment circuit 210 receives comparison result 209 and generates dynamic AWT value 211 to replace the original AWT contained in OPEN frames received by SAS expander 204, which correspond with the address or device for which the desired performance value or performance quota was set. The replacement may be in the form of, for example, assigning or overwriting the original AWT, or by arithmetically incrementing or decrementing it. Once dynamic AWT value 211 is loaded into the AWT value for the SAS expander, it will affect the downstream AWT as it propagates through SAS topology 200. In another embodiment, the replacement may be in the form of incrementing or decrementing on the incoming OPEN frame AWT by the dynamic AWT value generated by the adjustment circuit.

In one embodiment, if desired I/O performance value 207 is higher than measured I/O performance value 206, adjustment circuit 210 generates a dynamic AWT value 211 that is relatively higher than that of the previous AWT, whereas if measured I/O performance value 206 exceeds desired I/O performance value 207, adjustment circuit 210 generates a dynamic AWT value 211 that is relatively lower than that of the previous AWT. For example, when an incoming OPEN frame has a value of 10 and measured I/O performance value 206 is below desired I/O performance value 207, adjustment circuit 210 may increase dynamic AWT value 211 to 11.

Overall, the implementation of adaptation circuit 201 into the return path of SAS topology 200, dynamically increases the AWT and, thus, the proportion of arbitrations a particular device will win. As a result, the I/O performance quota of the device is increased until specified I/O performance value 207 is reached.

Figure 3:
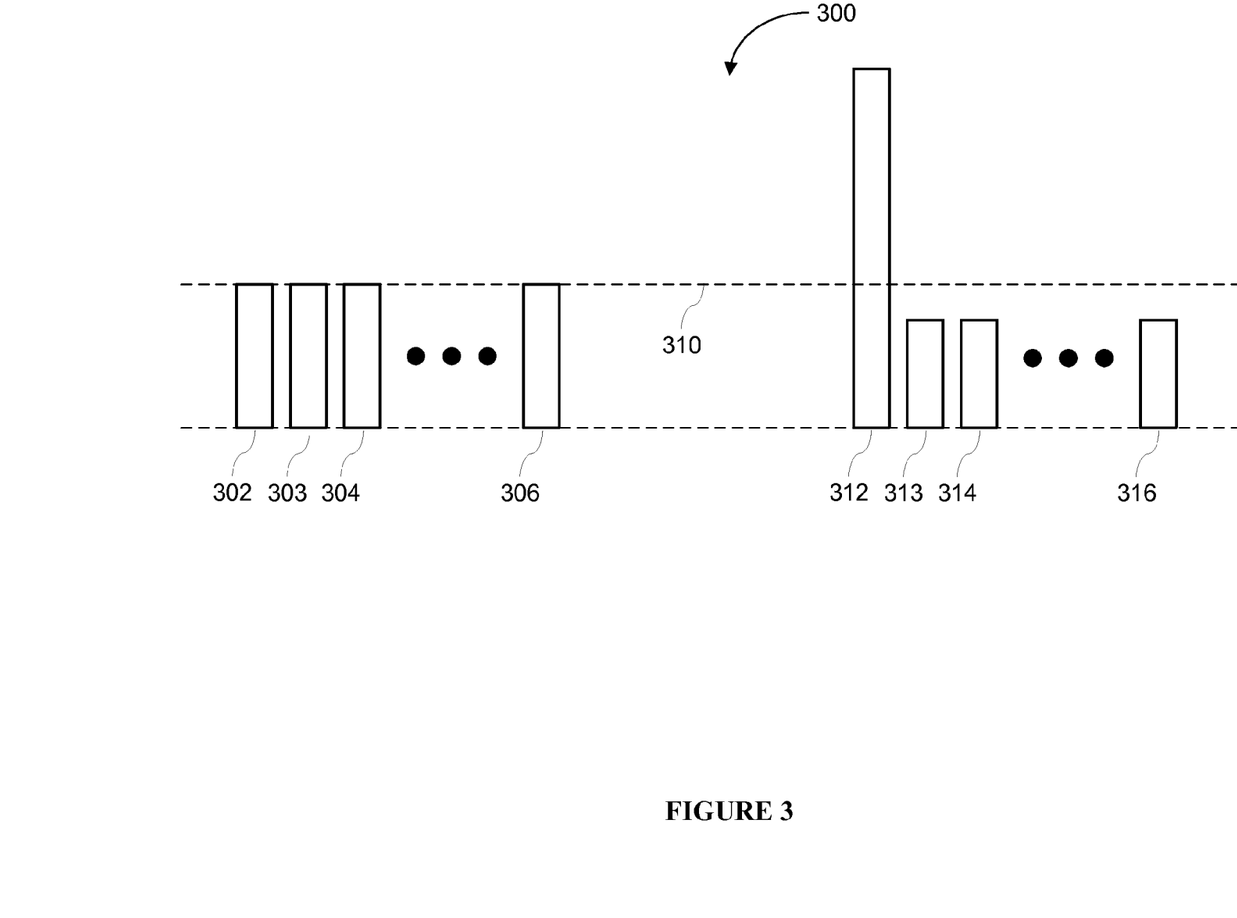
FIG. 3 is an exemplary bar graph illustrating the effect of implementing the adaptation circuit into various embodiments of the invention.

FIG. 3 is an exemplary bar graph illustrating the effect of implementing the adaptation circuit into various embodiments of the invention. Each of symbols 302-306 and 312-316 represents a measure for the I/O performance of a particular device. As previously described, for devices that are part of an enterprise storage system comprising storage devices, such as hard disk drives, the metric for measuring the performance is typically either in TOPS or MB/s.

Symbols 302-306 represent measures for the I/O performance of devices when embodiments of the invention are not active. In that situation, system performance is identical to prior art systems operating under the standard SAS arbitration fairness rules. Assuming that all devices 302-306 share the same workload, their throughput remains balanced, because link resources are divided evenly across all devices, according to the standard fairness rules in the SAS protocol. As indicated by performance level 310 in FIG. 3, the performance of each device 302-306 is identical. This is a typical result of using standard SAS arbitration fairness, which prevents high-performance devices that have to share available link resources of the SAS topology equally with all slower performing devices from performing at full capacity.

In contrast, symbols 312-316 represent measures for the I/O performance of devices when the adaptation circuit is active, according to various embodiments of the invention. One example of a high-performance device 312 may be a solid state drive device that performs orders of magnitude faster than slower performing devices 313-316, such as spinning disk drive devices.

As shown in FIG. 3, performance of high-performance device 312 is relatively higher than the performances of devices 302-306 and that of slower performing devices 313-316. The system designer may have configured high-performance drive 312 with an I/O performance quota that is higher than that of devices 313-316. For example, while the average performance across all drives 312-316 might be 1,000 IOPS, the designer may have configured high-performance drive 312 to operate at 10,000 IOPS. This may be accomplished by configuring the phy on the SAS expander that connects to drive 312. As a result, connections are divided unevenly across devices 312-316, which leads to the unequal I/O performance.

According to various embodiments of the invention the adaptation circuit allows performance quotas to be defined for one or more devices. All remaining devices split the remaining data bandwidth. As shown in FIG. 3, this results in slower performing devices 313-316 operating at the same performance level. In addition, although the performances of devices 313-316 are relatively lower than the performances of devices 302-306, due to the relatively much higher performances of device 312, the overall throughput of devices 312-316 is higher than that of devices 302-306.

Figure 4:
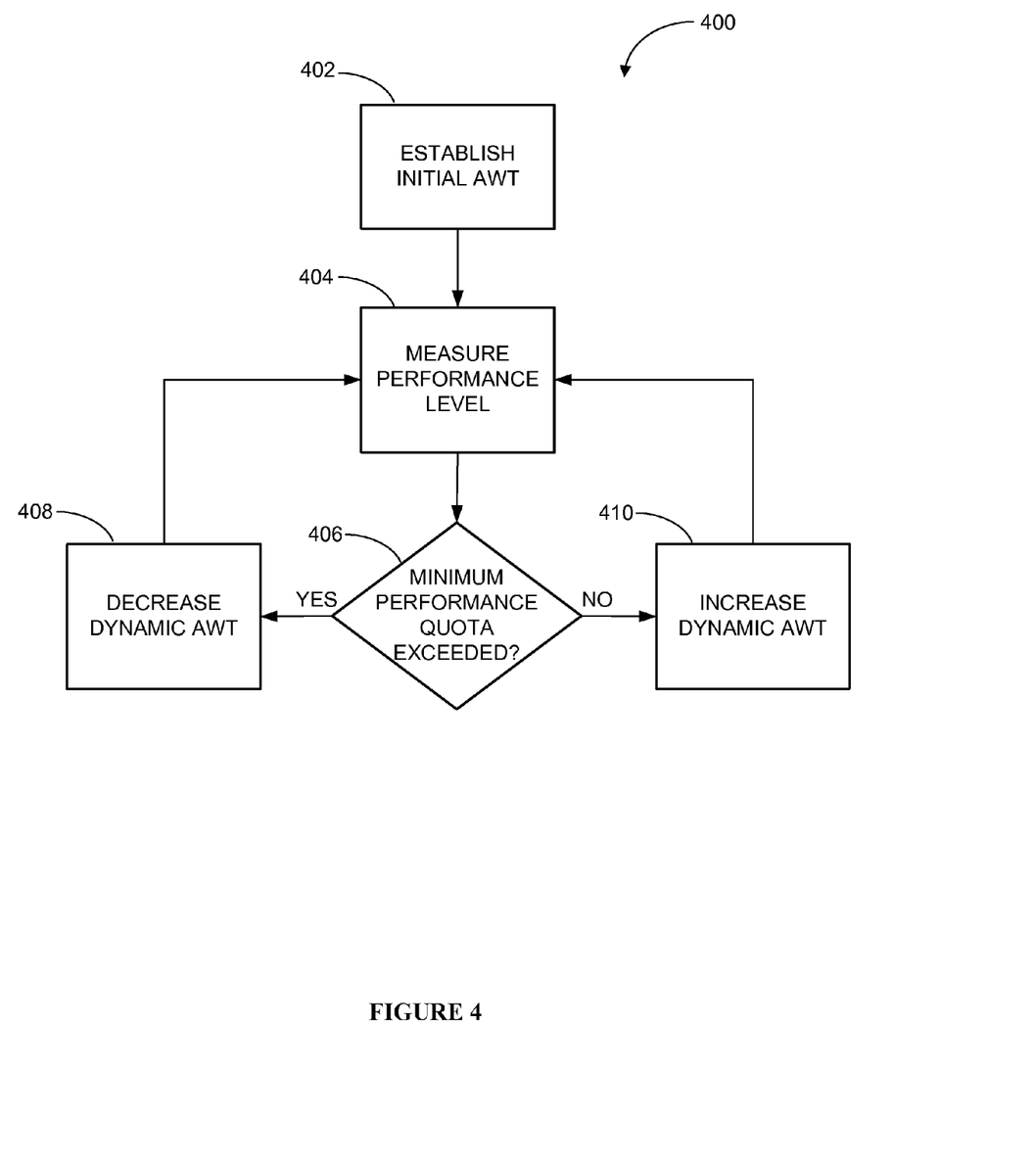
FIG. 4 is a flowchart that generally illustrates the processes performed by the AWT adjustment circuit according to various embodiments of the invention.

FIG. 4 is a flowchart that generally illustrates the processes performed by the AWT adjustment circuit according to various embodiments of the invention. At step 402, the AWT adjustment circuit establishes an initial AWT value (unrelated to the value received from the OPEN frame). The initial value may be pre-configured and can start at any offset value.

At step 404, the I/O performance of a connection is measured as I/O or MB/s, depending on the application. The level of the measured I/O performance is indicative of traffic through the expander. The performance level is measured for one adaptation period that may be timed. The adaptation period begins with the I/O performance measurement at step 404.

At step 406, the measured performance value is compared to a minimum I/O performance quota that a particular device is desired to operate at. The comparison may be accomplished, for example, by a comparator. Desired performance quotas can be pre-configured by the system designer for each device. Typically, a high performance device would be assigned a relatively higher quota to increase its workload and prevent the high performance device from underperforming.

In one embodiment, devices that already operate at a relatively high degree of utilization when compared to their data bandwidth are not generally assigned a quota. On the other hand, a quota is set to assign a greater share of the total data bandwidth to a device that makes demands on a sufficiently frequent basis. In one embodiment, devices without a performance quota share remaining bandwidth with un-adjusted AWT values under the standard fairness algorithm.

If at step 406 the measured performance is above the minimum I/O performance quota, then, at step 410, an adjustment circuit will dynamically increase the value of the initial arbitration wait time to increase the likelihood that the device will win the arbitration in the next adaptation period. If in the following adaptation period the device still operates below its minimum I/O performance quota the adjustment circuit will increase the value of the previous arbitration wait time to continue to increase the likelihood of winning the arbitration in the following adaptation period.

In contrast, if at step 406 the measured performance is below the minimum I/O performance quota, an adjustment circuit will dynamically decrease the value of the initial arbitration wait time to increase the likelihood that the device will win the arbitration in the next adaptation period. If in the following adaptation period the device still operates above its minimum I/O performance quota the adjustment circuit will decrease the value of the previous arbitration wait time to continue to decrease the likelihood of winning the arbitration in the following adaptation period. This prevents the high-performance from overperforming at the expense of reducing the fairness of access to lower performing devices.

This process allows the AWT adjustment circuit to dynamically adjust arbitration wait time values.

Figure 5:
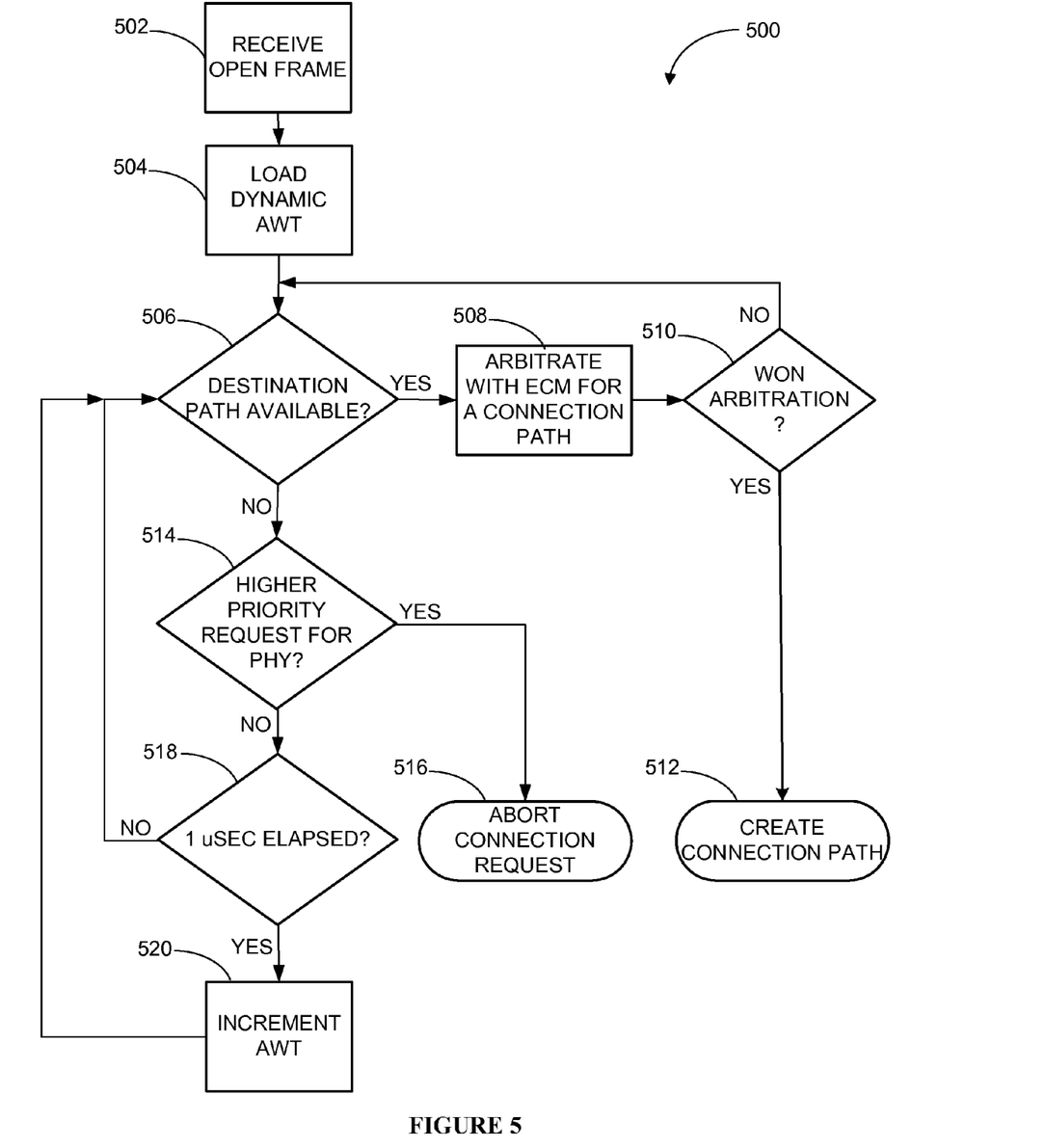
FIG. 5 is a flowchart that generally illustrates a modification to the arbitration fairness logic in a SAS expander utilizing a dynamic AWT value according to various embodiments of the invention.

FIG. 5 is a flowchart that generally illustrates a modification to the arbitration fairness logic in a SAS expander utilizing a dynamic AWT value according to various embodiments of the invention. The process for creating connection paths 500 starts at step 502 when an OPEN frame is received, similar to FIG. 1.

However, at 504, instead of loading the AWT from the OPEN frame, a dynamic AWT value generated by an AWT adjustment circuit, such as shown in FIG. 2, is loaded into the AWT value for the device. The rest of the modified arbitration logic flowchart proceeds in the same manner as the flowchart in FIG. 1. Because of modified AWT values, the actual throughput achieved by the device will be modified as well.

At 504 an initial AWT value is loaded from the OPEN frame into the AWT value for the SAS expander. The OPEN frame also contains a destination address to the target device.

At step 506, the SAS expander determines whether the destination path is available to make the connection between the source device and the target device of the request.

If the destination path is available, i.e. connection path not active to another phy, then, at step 508, the SAS expander performs arbitration with the SAS expander's expander connection manager (ECM). The ECM assigns winner status first to the pending OPEN frame having the highest AWT value, or in the event of a tie to the highest source address. The highest AWT value indicates that the winning OPEN frame has been waiting the longest.

At step 510, if the arbitration is won by the present connection request, then the SAS expander creates a connection path 512 for the device. If the arbitration is not won by the present connection request, then the device returns to step 506 to again determine whether the destination path is available. It is possible that steps 506-510 will be repeated multiple times before determining that there is no destination path available. For example, when a SAS port, in order to increase data transfer rates, allows multiple phys to connect to the same target device using multiple open connections.

If at step 506 the destination path is occupied, then, at step 514, the SAS device determines whether any pending OPEN frames that request the same destination as the present OPEN frame have a higher AWT value, i.e. a higher priority.

If such higher priority request exists, for example, a request with a higher AWT returning through the source address of the present request, then the SAS expander signals the present OPEN frame to abandon or abort the connection request 516, thereby making the connection available for the higher priority request.

If no other OPEN frame with a higher AWT value is requesting the originating source address of the present OPEN frame, then, at step 518, the SAS expander determines whether a certain waiting period, for example, one microsecond has elapsed since the SAS device received the present OPEN frame.

At step 520, if one microsecond has elapsed, the SAS device increments the AWT value for the present OPEN frame and returns to step 506 to continue to determine the availability of the destination path. If, at step 518, one microsecond has not elapsed yet, then the SAS device still returns to step 506 to continue to determine the availability of the destination path. One of the loops involving steps 506, 514, 518, and 520 or steps 506, 508, and 510 is repeated until either the AWT value is high enough to win arbitration at step 510 and a connection path is created 512, or until, at step 514, another, higher priority request for the originating phy exists, such that the present connection request is aborted 516.

It will be appreciated to those skilled in the art that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the claims in the future non-provisional application will include all such modifications, permutation and equivalents as fall within the true spirit and scope of the present invention.

We claim:

1. A resource allocation controller operable in a storage network, the controller comprising:
    a performance measurement element that measures a performance metric on a storage expander within the storage network;
    a comparator coupled to the performance measurement element, the comparator compares the measured performance metric to a threshold value and generates a comparison result;
    an arbitration wait time ("AWT") adjustment circuit coupled to the AWT adjustment circuit is configured to dynamically increase and decrease an AWT value based on the comparison result; and
    a demand frequency monitoring circuit to detect a demand frequency of an address, wherein the controller sets the threshold value higher in response to detecting an increase in the demand frequency and lower in response to detecting a reduction in the demand frequency.

2. The controller according to claim 1, wherein the performance metric is representative of a data transfer amount per unit time.

3. The controller according to claim 1, wherein the threshold value is representative of a device utilization.

4. The controller according to claim 1, wherein the controller is coupled to a solid state storage device.

5. The controller according to claim 1, wherein the controller is coupled to a mechanical spinning disk drive.

6. The controller according to claim 1, wherein the threshold value is programmable.

7. The controller according to claim 1, the controller receives the threshold value from an out of band communication link.

8. The controller according to claim 1, the controller receives the threshold value from in band communication link.

9. The controller according to claim 1, wherein the adjustment circuit further comprises circuitry to load or replace the AWT value into an OPEN frame received by the storage expander in response to the measured performance metric exceeding the threshold value.

10. The controller according to claim 1, wherein the AWT adjustment circuit further comprises circuitry to increment or decrement the AWT value in response to the measured performance metric exceeding the threshold value.

11. The controller according to claim 1, wherein the performance measurement element comprises a timer to monitor at least a part of the storage network.

12. The controller according to claim 1, wherein the performance measurement element is located at a port of the storage expander.

13. The controller according to claim 1, wherein the performance measurement element is located at a storage end device.

14. The controller according to claim 1, wherein the controller is located in the storage expander.

15. A method for allocating resources between devices in a storage network, the method comprising:
   measuring a performance metric on a storage expander;
   comparing the performance metric to a threshold value to generate a comparison result;
   dynamically increasing or decreasing an AWT value based on the comparison result that reallocates resources within the storage network;
   measuring a demand frequency of an address using a demand frequency monitoring circuit;
   comparing the measured demand frequency with the threshold value; and
   updating the threshold value.

16. The method according to claim 15, comprising the step of receiving the threshold value from an Ethernet connection.

17. The method according to claim 15, wherein the measured performance value is in reference to a specific address.

18. A method for allocating resources between devices in a storage network, the method comprising:
   measuring a performance metric on a storage expander;
   comparing the performance metric to a threshold value to generate a comparison result; and
   increasing an AWT value if the measured performance metric is below the threshold value; and
   decreasing the AWT value if the performance metric exceeds the threshold value.

19. A system for allocating resources in a Serial-Attached-SCSI ("SAS") storage network comprising:
   a first storage end device located within the SAS storage network;
   a second storage end device located within the SAS storage network, the second storage end device having performance characteristics different from the first storage end device; and
   at least one storage expander coupled in the SAS storage network, the at least one storage expander comprising:
      a performance measurement element that measures a performance metric within the storage network;
      a comparator coupled to receive the measured performance metric, the comparator compares the measured performance metric to a threshold value and generates a comparison result;
      an arbitration wait time ("AWT") adjustment circuit coupled to receive the comparison result, the AWT adjustment circuit dynamically increases and decreases an AWT value based on the comparison result;
      a demand frequency monitoring circuit to detect a demand frequency of an address, wherein the controller sets the threshold value higher in response to detecting an increase in the demand frequency and lower in response to detecting a reduction in the demand frequency.

20. The system according to claim 19, wherein the first storage end device is a solid state storage device and the second storage end device is a mechanical spinning disk drive.

* * * * *